March 25, 1952  W. E. MacKENZIE  2,590,427
WRAPPING MACHINE FOR LIGHTLY COMPRESSED GRANULES
Filed Aug. 25, 1947  10 Sheets-Sheet 1
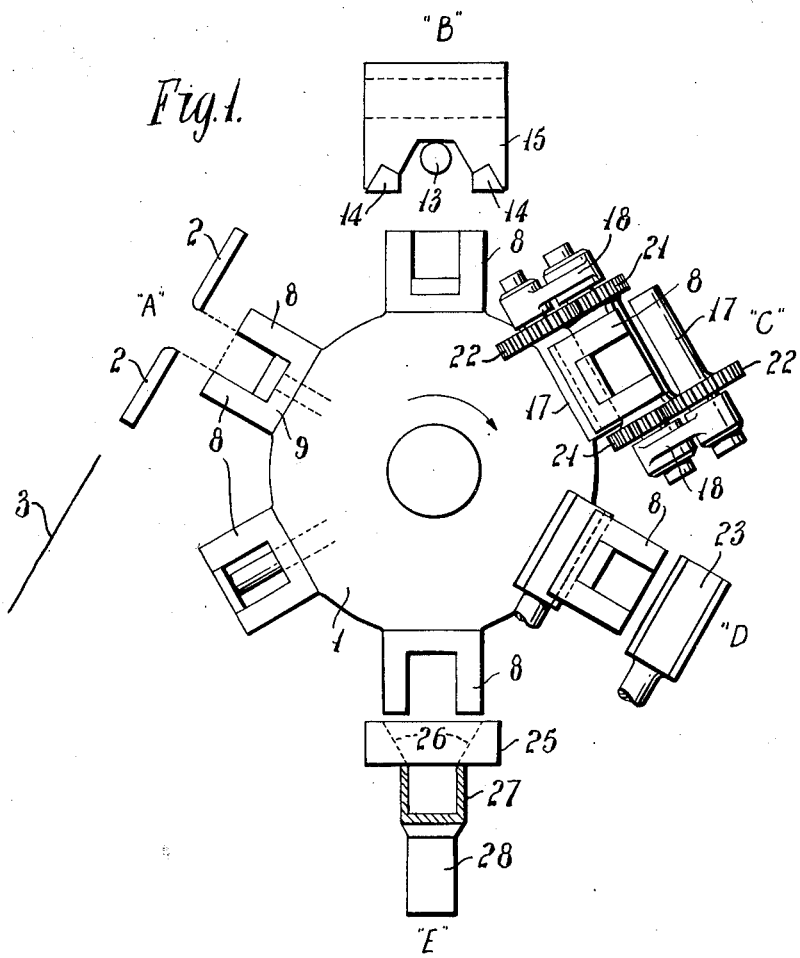
INVENTOR
William E. MacKenzie.
BY
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 2
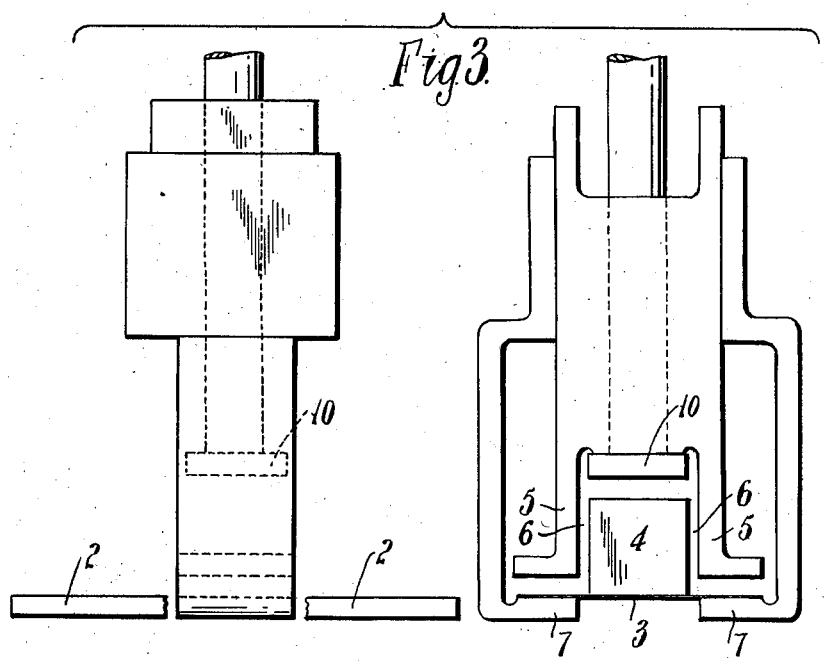
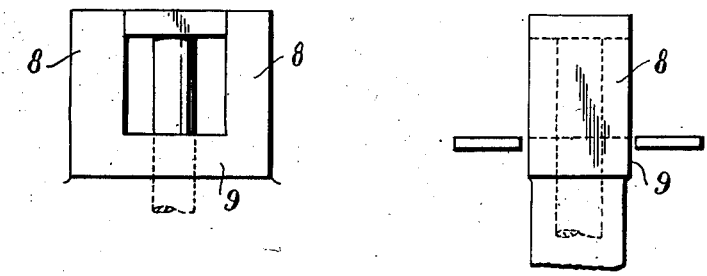
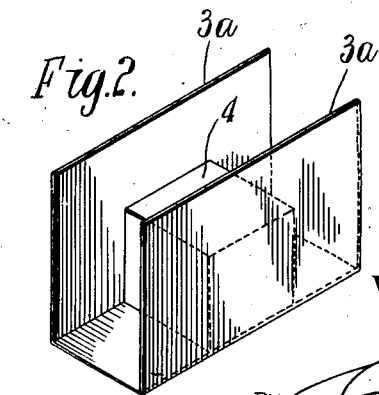
INVENTOR
William E. MacKenzie.
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 3
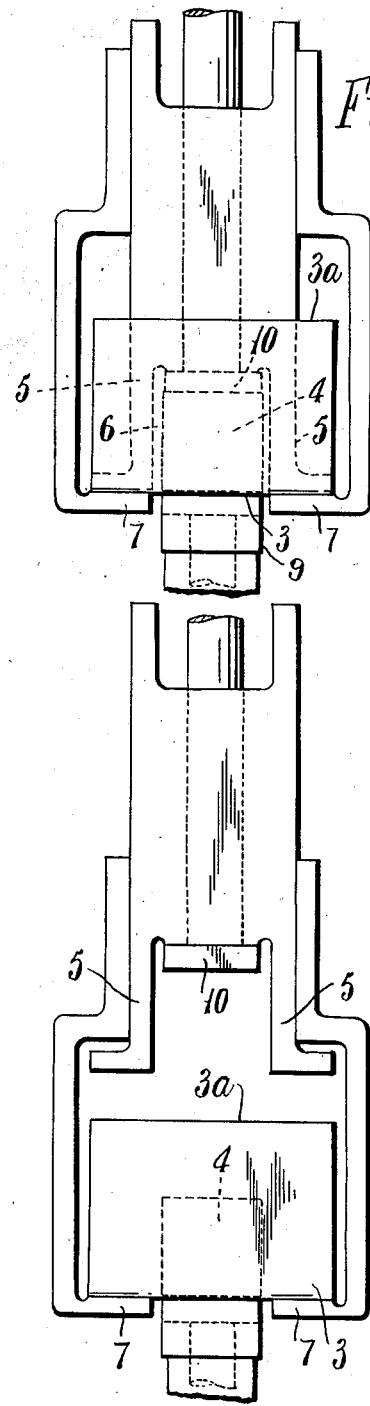
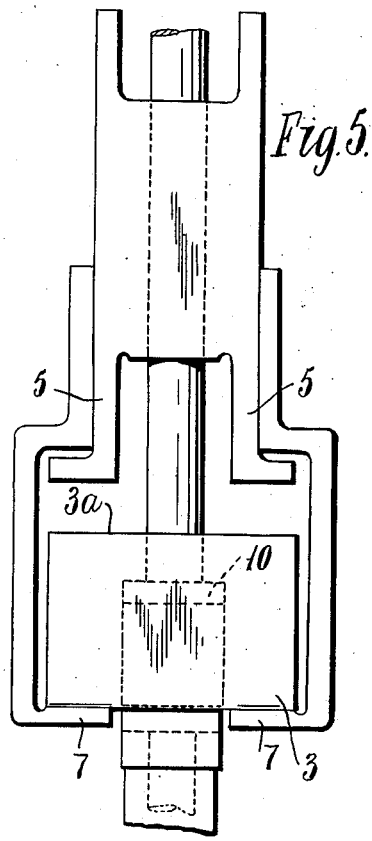
INVENTOR
William E. MacKenzie.
BY
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 4
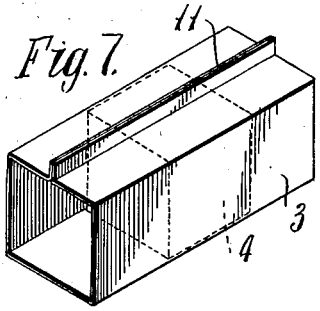
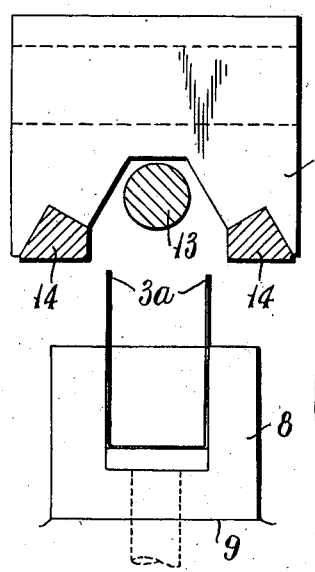
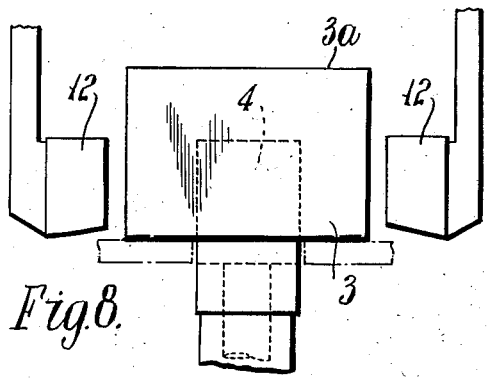
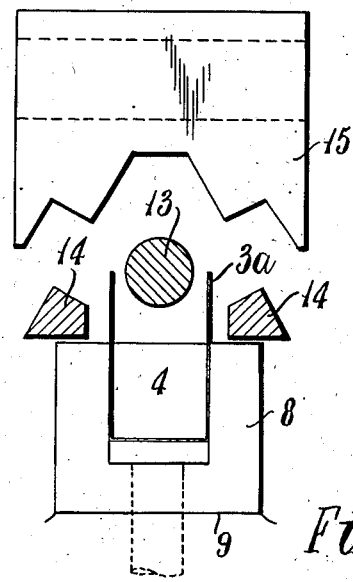
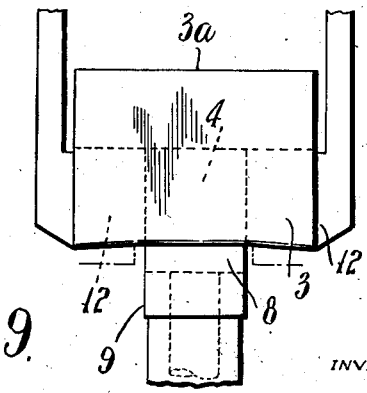
INVENTOR
William E. MacKenzie.
BY
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 5
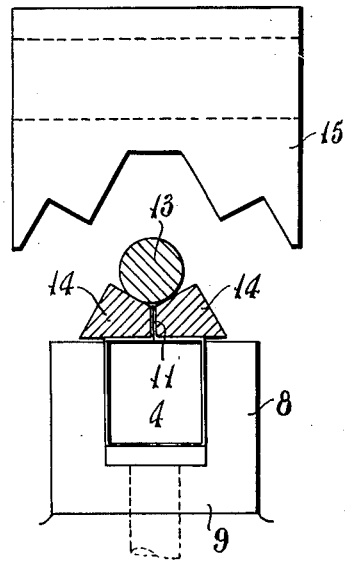
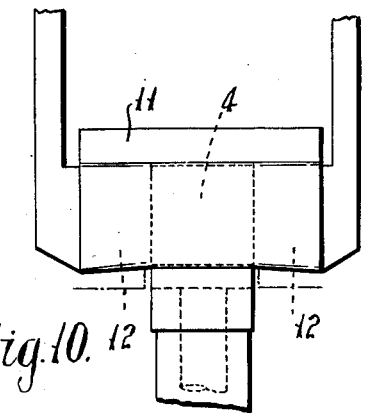
Fig. 10.
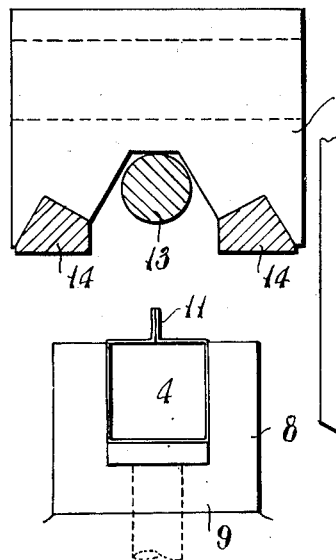
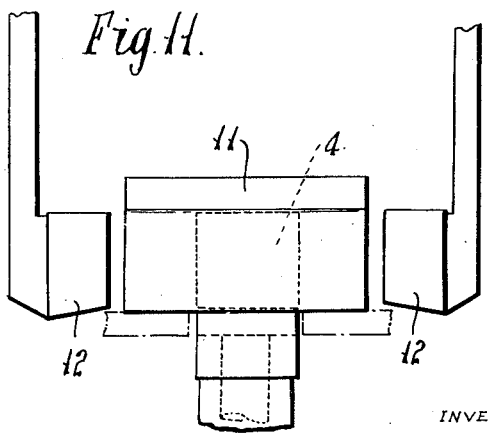
Fig. 11.
INVENTOR
William E. MacKenzie.
BY
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 6

INVENTOR
William E. MacKenzie.
BY
ATTORNEY

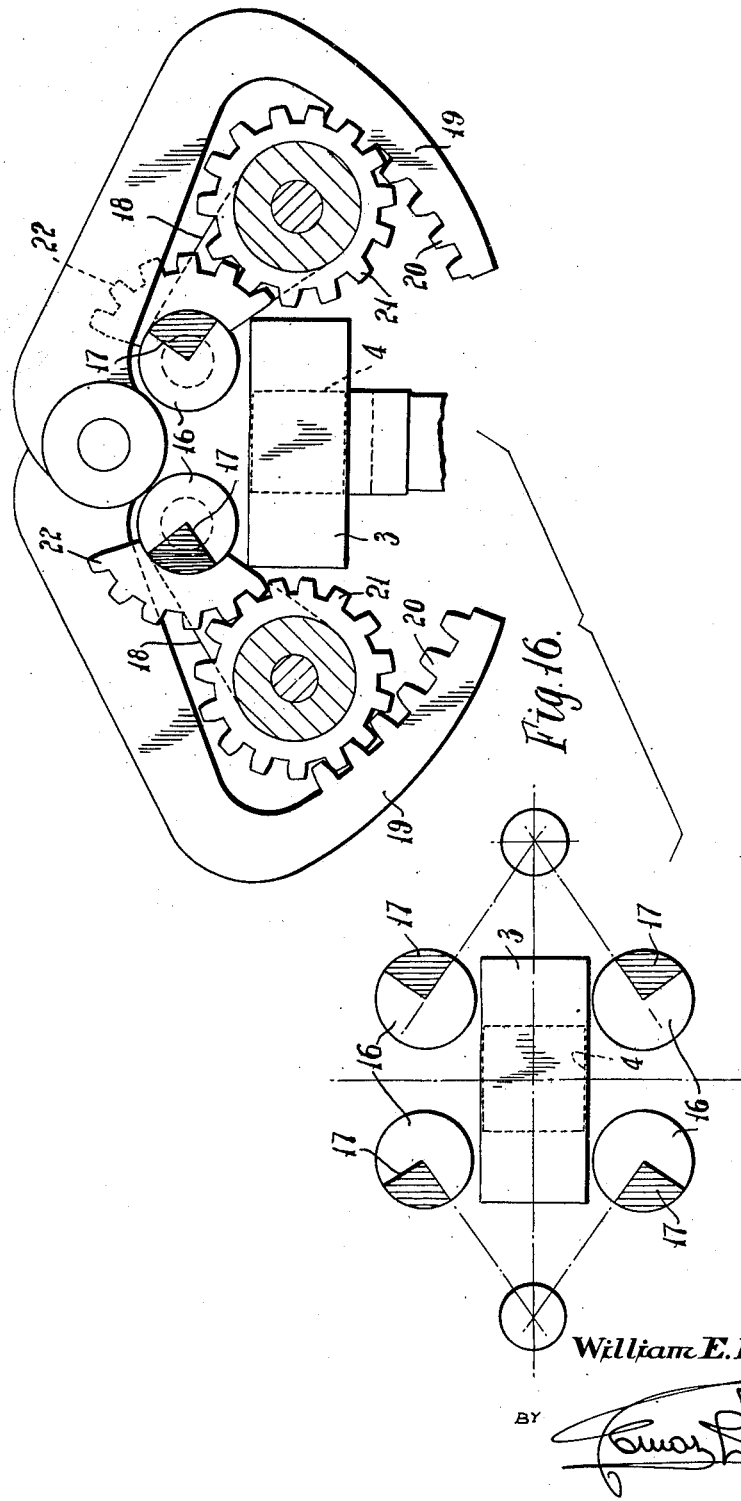

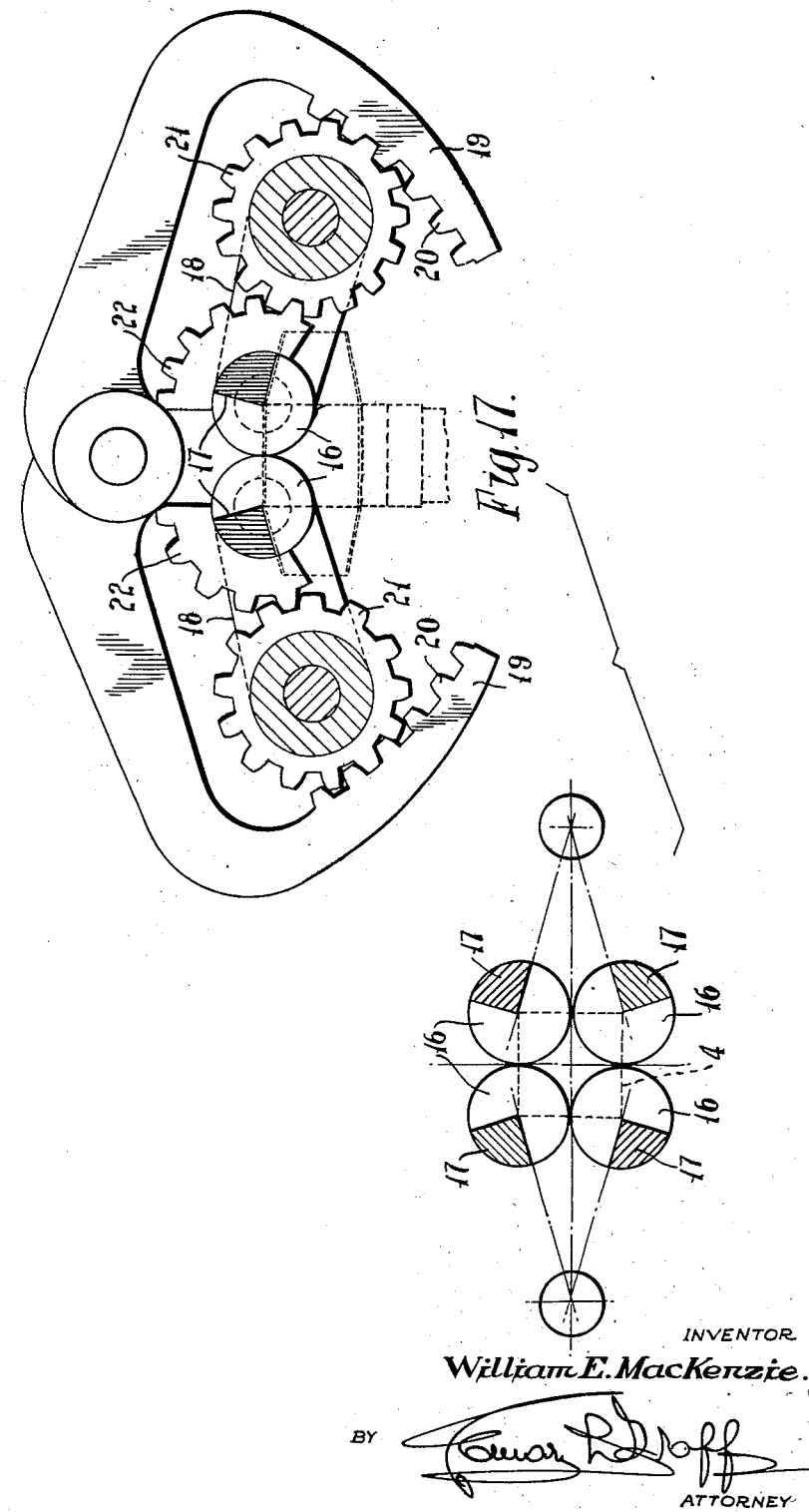

March 25, 1952 W. E. MacKENZIE 2,590,427
WRAPPING MACHINE FOR LIGHTLY COMPRESSED GRANULES
Filed Aug. 25, 1947 10 Sheets-Sheet 9
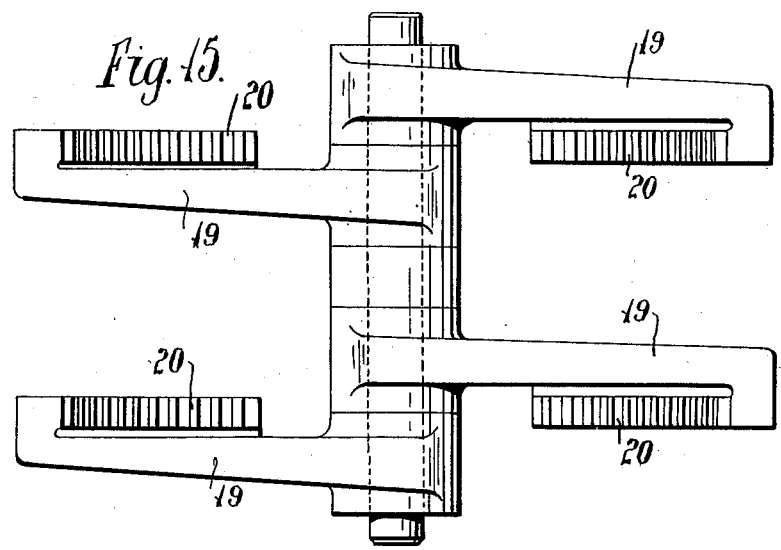
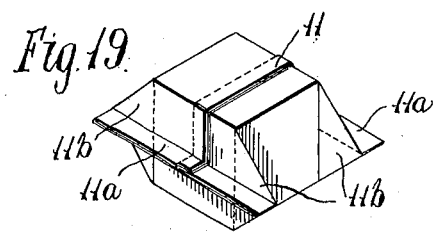
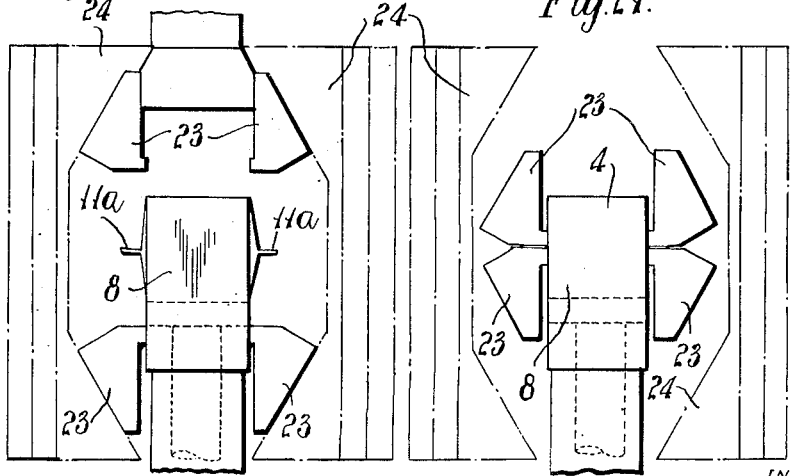
INVENTOR
William E. MacKenzie.
BY
ATTORNEY March 25, 1952 W. E. MacKENZIE 2,590,427
WRAPPING MACHINE FOR LIGHTLY COMPRESSED GRANULES
Filed Aug. 25, 1947 10 Sheets-Sheet 10

INVENTOR
William E. MacKenzie.
BY
ATTORNEY

Patented Mar. 25, 1952

2,590,427

UNITED STATES PATENT OFFICE 2,590,427

WRAPPING MACHINE FOR LIGHTLY COMPRESSED GRANULES

William Ewan MacKenzie, South Croydon, England

Application August 25, 1947, Serial No. 770,512
In Great Britain August 26, 1946

4 Claims. (Cl. 53—130)

This invention relates to wrapping machines and has for its object to provide a wrapping machine which is capable of folding a wrapping material around an article to be wrapped and at the same time effect sealing of the edges of the wrapping material without bringing any pressure to bear on said article so as to avoid distortion and other damage to the article. A further object of the invention is to provide a machine adapted to effect the wrapping of articles as they are fed continuously to the machine whereby the wrapping of a large number of articles per unit of time may be carried out expeditiously, efficiently and inexpensively.

The invention is more particularly, although not exclusively, concerned with the wrapping of cubes of meat extract in solid form and referred to hereinafter simply as cubes. When known wrapping machines, the cubes themselves have been used as formers against which the wrapping is pressed as it is folded about each individual cube. Such apparatus however cannot be satisfactorily employed for handling cubes of meat extract as at present produced and which are formed of lightly compressed granules to enable the cube to be readily disintegrated when used to render the cube more easily soluble.

The chief physical characteristics of the cube which influence the wrapping operation can be tabulated as follows:

(a) The cube is formed of lightly compressed granules and the degree of compactness is such that the consumer is able to dissolve the cube easily and rapidly.

(b) The cube must be firm enough to allow handling through the tabletting machine and through the wrapping and cartoning stages without breakage.

(c) After wrapping the cube must present a well formed shape of pre-determined maximum size and minimum weight.

(d) The cube is highly hydroscopic and the wrapping material used must be of a moistureproof quality and fused at all joints to prevent the cube taking up moisture after packaging. This precaution also prevents the cube absorbing foreign flavours whilst in stock.

(e) As the material of the cube melts at low temperature care must be taken in fusing together the joints of the wrapping material to avoid heat being applied directly to the cube so that the material of the cube does not melt and adhere to the inside of the wrapping.

(f) The wrapping must be capable of being easily opened by the consumer without compressing or distorting the cube.

Owing to the soft and plastic nature of the cubes as at present formed it will be readily appreciated that existing wrapping machines cannot be advantageously employed as by using the cubes as formers the cubes would become compressed and reduced in size and distorted in shape or may crumble during the wrapping operation and so render the machine inoperative. Additionally the heat sealing of the wrapping with existing machines does not form a positive fused joint between overlapping parts of the wrapping and a moistureproof wrap is not assured. Further, with present apparatus, the heat sealing pressure is applied direct to the face of the cube, thus further distorting the shape and introducing a risk of local overheating of the product.

The wrapping machine provided by the present invention avoids the foregoing undesirable features and mechanism is provided wherein the wrapping of the cube is not dependent upon the use of the cube itself as a former. The original shape and size is retained and a clearly defined wrapped cube of attractive appearance is obtained. Also the sealing operations are effected by applying heat and pressure direct to the jointing film, thus allowing maximum temperature and pressure for positive sealing without affecting the physical characteristics of the cube.

Broadly, according to the present invention, there is provided a wrapping machine wherein the article to be wrapped is guided into a carrier member with its wrapping to fold the wrapping partly around the cube in such a manner that no pressure is applied directly to the cube, the carrier with the partly wrapped cube therein thereafter passing through various wrapping and sealing stages of the machine for effecting complete wrapping of the article by means which fold the wrapper about the article without pressing against the latter, the sealing operations being effected by applying heat and pressure direct to the overlapping edges of the wrapping material without acting directly upon the cube within the wrapping.

According to an embodiment of the invention described herein and which is intended for wrapping articles of cube form the machine comprises a rotor provided with a plurality of carrier members which are moved intermittently by partial rotation of the rotor to bring the carriers successively into positions opposite stations or stages for effecting a particular wrapping and/or sealing operation. Each of said carriers is of U shape and at the first station of operations each carrier is moved beneath or in juxtaposition to a table on to which strips of wrapping material are successively fed, there being provided above or on the other side of the table means which is adapted to deliver a cube fed on to said wrapping in to the carrier without bringing any pressure to bear on said cube. The second station of the machine is adapted to fold the upper edges of the wrapping (which now assumes a U shape about the cube) on to the top of the cube and to form at the meeting edges of the wrapping a lip which is heat treated to seal the portions of the wrapping forming the lip together. After the wrapping has been folded on to the top of the cube the carrier moves with the rotor to a third station and during its passage to this third station the said upstanding lip is acted upon by a wiper which serves to wipe the lip flush against the top of the cube. At the third station the mechanism is adapted to fold the wrapping against the ends of the cube and to form at the meeting edges of the wrapping at each end a lip. The mechanism of the fourth stage is adapted to heat seal the lips formed by folding the wrapping material over the ends of the cube, the said sealing means comprising pairs of heat sealing members between which the said lips are positioned and which are adapted to be closed together to engage the lips on either side thereof. If desired the sector shaped folding members for the ends of the wrapping and the heat sealing means for the lips thereof may be combined into a single unit. The last stage of the wrapping consists in feeding the cubes through a hollow member which is formed with a suitable profile internally to fold over triangular ears which remain at each end of the cube.

In order that the invention may be clearly understood and readily carried into effect, reference will now be made to the accompanying drawings which illustrate one embodiment of the invention by way of example as applied to the wrapping of cubes of meat extract already referred to.

In the drawings:

Figure 1 is a diagram illustrating the lay out of the machine and showing the various stages thereof.

Figure 2 is a perspective view showing how the wrapping is folded about the cube during the first wrapping operation or stage.

Figure 3 comprises a side elevation and a front view of the mechanism for folding the wrapping as shown in Figure 2.

Figures 4, 5 and 6 are front views illustrating the movements of the mechanism shown in Figure 3 during the first wrapping operation.

Figure 7 is a perspective view showing how the wrapping is folded about the cube at the second stage.

Figures 8, 9, 10 and 11 are views showing the mechanism for producing the wrap shown in Figure 7.

Figure 12:
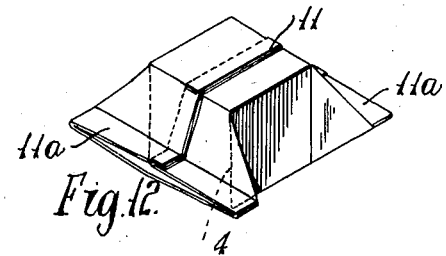

Figure 12 is a perspective view showing how the wrapping is folded about the ends of the cube at the third wrapping stage.

Figures 13 to 18 are views of the mechanism employed for producing the folding of the ends of the wrapping.

Figure 19 shows the wrapped cube after end lips, formed during the third wrapping operation, have been heat sealed, and Figures 20 and 21, illustrate means for heat sealing the end lips shown in Figure 19.

Referring to Figure 1 of the drawings the apparatus comprises a rotor 1 having five stations or stages designated A, B, C, D and E and is adapted to be rotated partially and intermittently to bring each cube opposite a station at which a particular wrapping and/or sealing operation is performed. The wrapping rotor 1 is preferably adapted to revolve in a vertical plane and may be used in conjunction with a cartoning machine not shown forming the subject matter of my co-pending patent application No. 770,511, filed August 25, 1947, and which is adapted to be rotated in a horizontal plane and to receive the cubes as they are completely wrapped and sealed by the apparatus of this invention. Alternatively any other suitable cartoning apparatus may however be employed, or the wrapped cube may be discharged to a standard machine for forming a pack of multiple units, i. e. five, six, ten or fifteen cubes.

The wrapping material preferably comprises material known under the registered trade-mark "cellophane" but any other suitable wrapping may be employed. For example the wrapping may comprise any suitable kind of foil, such as aluminium foil, which can be heat sealed.

The first station or stage A of the wrapping machine comprises a bed or plate 2 on to which is passed successively strips of wrapping material 3 from a feed roll, the strip being cut automatically into the required lengths as it leaves the roll. As these strips pass on to said plate 2 the cube is delivered on to the strip in a transverse direction by a reciprocating plunger which is of known construction and will not be described in further detail.

The first stage A partially wraps the cube as shown in Figure 2 and the mechanism comprised in stage A is illustrated diagrammatically in Figures 3 to 6. Referring to these figures the cube 4 is fed on the cellophane material 3 (referred to hereinafter as the wrapping) between a pair of paper gripping members 5, the distance between these members being greater than the width of the cube 4 to ensure that a clearance 6 is left so that no crushing of the cube can take place; this being a very important feature. When the cube 4 is between these gripping members 5 the latter are moved axially downwardly to grip the wrapping 3 projecting beyond the ends of the cube 4 between these and a second pair of gripping members 7 over which the end edges of the wrapping 3 are fed. Any suitable actuating mechanism may be employed for moving the gripping mechanism axially from their positions shown in Figure 3 and initial movement is first applied to the first mentioned gripping mechanism 5 to move them against the second mentioned gripping members 7 with the ends of the wrapping gripped between the two sets of members 5 and 7. The two sets of members 5 and 7 then move as a unit and as shown in Figure 4 pass downwardly between a pair of upstanding guide members 8 of a U-shaped carrier 9 located below the gripping members 5 and 7 so that these guide members 8 act to fold the sides of the wrapping 3 about the ends of the cube 4.

To ensure proper location of the cube 4 as it passes into the carrier member 9 the upper gripping members 5 may have associated therewith a reciprocating plunger 10 which acts solely as a locating member and does not apply any pressure at all to the cube 4 except to guide the latter.

With the wrapping folded U shape about the ends of the cube 4 the first mentioned gripping members 5 and the plunger 10 move upwardly, first the members 5 as shown in Figure 5 and thereafter the plunger 10 as shown in Figure 6, and with the lower gripping members 7 still remaining in position, the carrier 9 moves from between the second mentioned gripping members 7 and passes in an arcuate manner to the next and second folding stage B, the lower gripping members 7, when the carrier 9 has moved therefrom, rising to their original position as shown in Figure 3 ready for a subsequent operation.

The next stage B is to fold the upper edges 3a of the ends of the wrapping 3 horizontally across the top of the cube as shown in Figure 7, the wrapping 3 being of sufficient size so that the top edges 3a of the wrapping about to provide an upstanding lip or tag 11 which may be heat sealed as hereinafter described. This mechanism is illustrated by Figures 8 to 11.

When the cube carrier 9 reaches this second stage B two packing pieces 12 are fed endwise into the open ends of the U-shaped wrapping 3 so that the cube 4 is located between these packing pieces 12. The packing pieces also keep the wrap at each end of the cube in the correct formation during the folding and sealing operation.

The folding mechanism for forming the tag 11 at the top of the cube 4 comprises a rod 13 having disposed on either side thereof two folding elements 14 which, as the carrier 9 moves into position, are moved towards the latter from the positions shown in Figure 8 so that the rod 13 is positioned between the top edges 3a of the wrapping 3 and the folding elements 14 at the outer sides thereof as shown in Figure 9. The folding elements 14 then move towards one another as shown in Figure 10 and the upstanding edges are guided below said rod 13 and the folding elements fold the wrapping neatly along the top face of the cube 4. The folding elements 14, when they have completed their movement form between them the before mentioned upstanding lip or tag 11 which comprises two thicknesses of paper as shown in Figure 10. The folding elements 14 are also heating elements which heat the upstanding lip 11 and seal the two thicknesses of wrapping material together. In this respect it is to be pointed out that the wrapping material 3 may be pretreated with a heat sealing medium, i. e. a substance which when heated becomes adhesive, or a wrapping material 3 may be used which in itself is self binding upon the application of heat.

The folding and sealing members 14 may be heated in any suitable manner, a convenient means comprising a heating element 15 with which the members engage when in an inoperative position as shown in Figure 8 and from which heat is transmitted to the elements 14. Instead of heating the elements 14 as above described the elements may incorporate in themselves a heating means i. e. a resistance, or alternatively, they may be heated by hot oil which is fed into the elements in any suitable manner.

When this folding and sealing operation has been performed the sealing elements 14 and the rod 13 move away from the partly wrapped cube as shown in Figure 11 leaving the latter free in its carrier 8 to be moved on the next and third stage C, the packing pieces 12 having previously been withdrawn from the open ends of the now hollow wrapping 3 of the partially wrapped cube. The carrier member 8 again passes over an arcuate path and reaches the third stage C where two ends of the cube wrapping are folded over the ends of the cube as shown in Figure 12.

Figure 18:
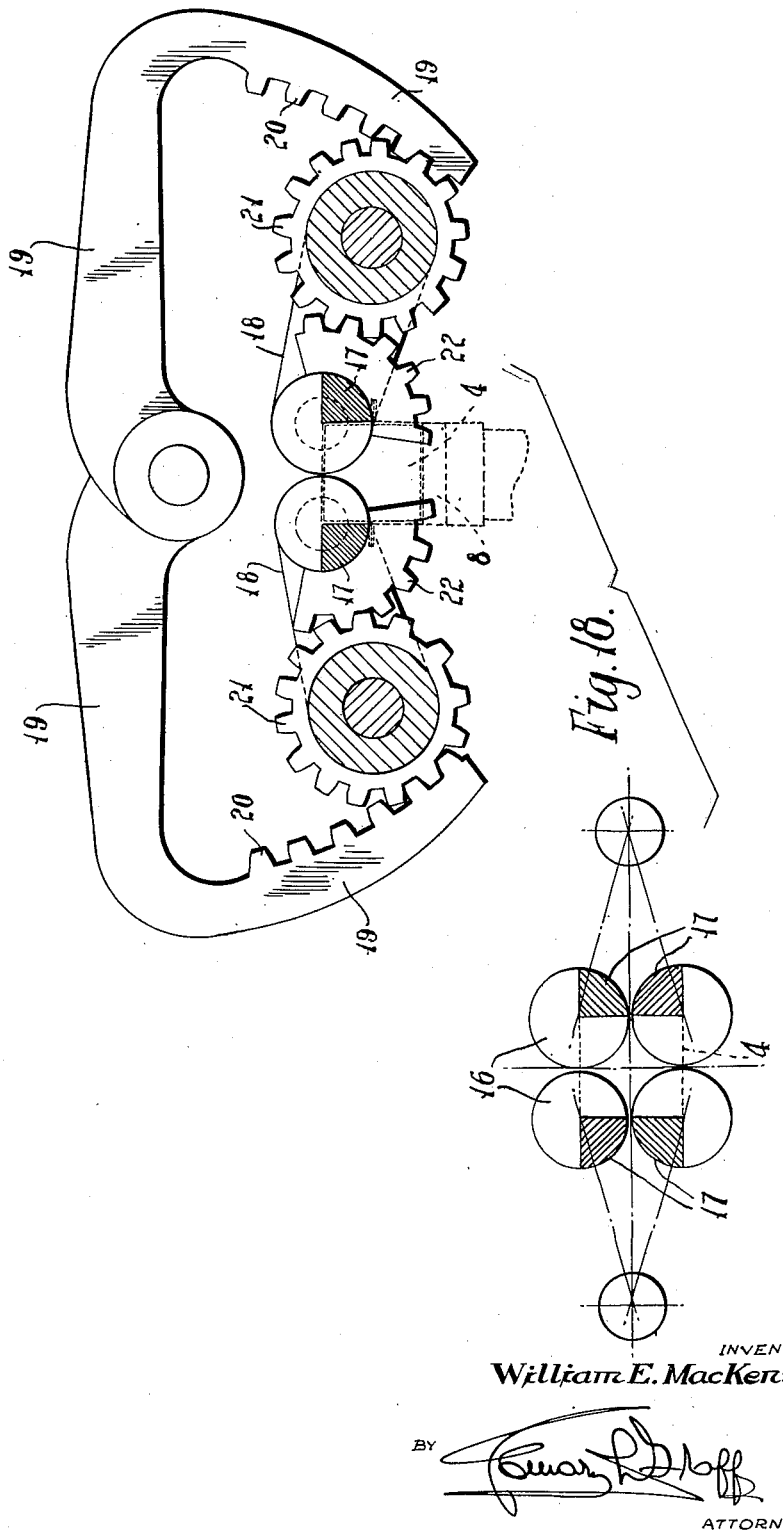

During the passage of the partly wrapped cube to the next stage the upstanding lip is acted upon by a wiper which serves to wipe the lip flush against the top of the cube. The carrier 8 then passes between mechanism illustrated by Figures 13 to 18 comprising two pairs of members 16 disposed one pair at the top of the cube and one pair below the cube and these rollers carry sector-shaped folding members 17. These members 16 are rotatably carried at the ends of radial arms 18. The arms 18 which carry the sector-shaped folding members 17 pivot towards one another and in operation each sector 17 is rotated and a flat side of each sector, above and below the cube 4 and at each end thereof, first engages against the end of the wrapping as shown in Figure 17 and during continued movement of the arms 18 the sectors 17 are rotated through approximately 90° about the centre or pivotal point of the sector so that the flat sides of the sectors 17 engaging the wrapping at each end of the cube 4 eventually become aligned and are parallel with the end face of the cube as shown in Figure 18. When the two ends of the wrapping 3 are folded about the ends of the cube there is provided at each end a lip 11a formed of two thicknesses of paper which is then heat treated as about to be described to effect sealing of the ends of the cube.

Any suitable gearing may be employed to swing the arms 18 carrying the folding sectors 17 and also for partially rotating the said sectors 17 to bring a flat side thereof against the end of the cube 4. Conveniently, said gearing may comprise a pair of jaws 19 formed internally with a rack portion 20 which engages a gearwheel 21 at the outer end of each radial arm 18 so that the latter is swung automatically during opening and closing of the jaws 19. In turn, each gear wheel 21 engages an arcuate gear sector 22 of a gear wheel fast with each sector 17 so that each gear wheel 21 is turned to swing its radial arm 18 it also acts to rotate the sector 17 partially to bring a flat side thereof flush against an end of the cube 4.

Figure 13:
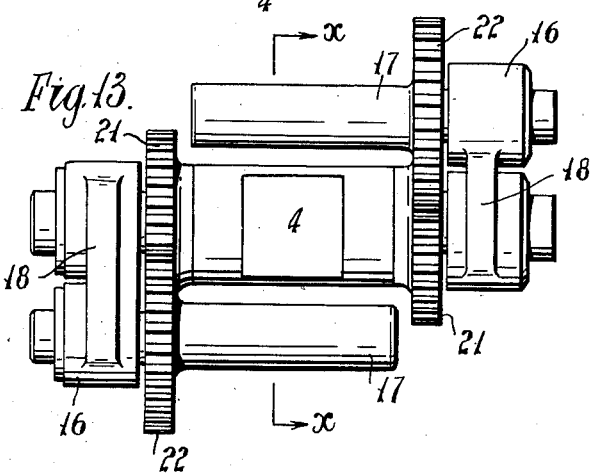
Figure 14:
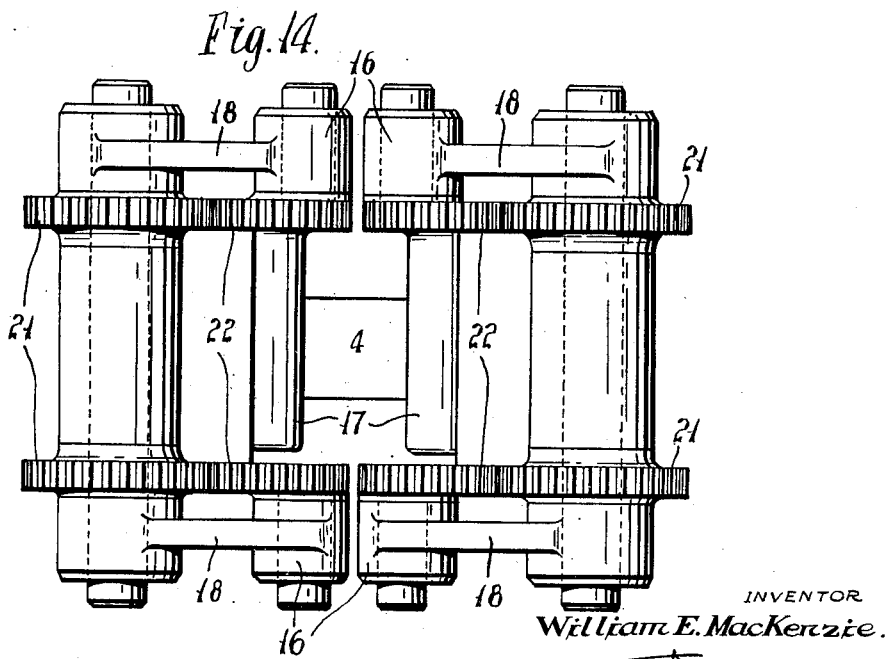

It should be noted that in Figures 16, 17 and 18 that the lower folding sectors 17 and the jaws 19 and associated mechanism are omitted, as these views are taken on the line x—x of Figure 13. The diagrams attached to these figures however show the movements of both the upper and lower sectors 17.

The folding elements or sectors 17 are now moved to an open position ready for a subsequent operation and the carrier 9 again moves through an arcual path to the next and fourth stage D which is to heat seal the lips 11a of the folded ends of the wrapper.

The carrier 9 at this fourth stage D is then located as shown in Figures 20 and 21, between pairs of heating elements 23 which are moveable towards one another from the positions shown in Figure 20 to the positions they occupy in Figure 21 and when so moved grip the lips 11a at the ends of the cubes between them to heat said lips and effect sealing of the folded ends of the wrapping which now appears as shown in Figure 19. As in the case of the previously mentioned heating elements 14 the elements 23 may be heated in any suitable manner e. g. by contact with heaters 24 but the invention is not restricted to heating by heat transfer parts against which the elements abut when not in use.

If desired, the last mentioned two stages C and D, i. e. the folding of the wrapper about the ends of the cube and the heat sealing of said folded ends may be combined, the folding and sealing members 14 and 23 being made as a single unit to combine both operations.

The carrier 9 is once again moved through an arcuate path to the fifth and final wrapping stage E which consists of releasing the wrapped cube 4 from its carrier 9 and feeding the cube through feed mechanism which also serves to fold the two lips 11a at the ends of the cube flush against said ends and also to fold over triangular portions 11b of the wrapper resulting from the folding operations.

The means for folding the ends of the cube wrapping may simply comprise as shown at station E on Figure 1 a hollow block 25 which is suitably shaped internally to present a profile 26 which receives the folds and turns them flush against the ends and sides of the cube 4. The completely wrapped cube with all the folds flush against the sides and ends of the cube then enters a trough 27 in which reciprocates horizontally a plunger adapted to feed single cubes to the upper end of a chute 28 through which the wrapped cube passes and which is fed through the chute by a vertical reciprocating plunger.

The wrapped cube 4 is then delivered to carton wrapping mechanism which preferably is that described in our co-pending patent application No. 770,511, or the wrapped cube may be discharged to a standard machine for forming a pack of multiple units, i. e. five, six, ten or fifteen cubes.

The foregoing description explains the operation of the mechanism of the machine at each stage and it will be appreciated that a continuous run of cubes is passing through the machine all the time and in the embodiment described by way of example the machine normally accommodates five cubes all of which are in different stages of wrapping.

To prevent cubes passing into the machine without their wrapping material an electrically operated cut out device may be provided in circuit with the electrical power control apparatus to the machine which will act to prevent cubes being fed to the machine when the feed of the wrapping material is interrupted; to stop the supply of wrapping material to the machine when the supply of cubes fails and to stop the machine when the supply of cartons on the cartoning machine with which the wrapping machine is associated, is interrupted.

While the invention has been described as being applicable to the wrapping of cubes of meat extract it will be readily appreciated that the apparatus may be employed for wrapping of other articles such as jellies or the like. Also, while reference has been made to articles of cube form it will be well seen that by suitably adapting the mechanism that articles of other shapes may equally well be wrapped by adjusting the sizes of the various parts of the mechanism. Again, articles having more than six sides may also be wrapped by increasing the number of folding and heat sealing means.

Having now particularly described and ascertained the nature of my said invention and in what manner the same is to be performed, I declare that what I claim is:

1. A machine for wrapping a formed article of lightly compressed granules without deformation thereof, comprising an intermittently driven rotor, a plurality of carriers on the rotor, a plurality of successively positioned operating stations positioned at intervals around the rotor in the cycle of travel of each carrier, a wrapper feed arrangement and an article feed mechanism at the first of said stations, said carriers being shaped to form the wrapper into a U-formation around the article to be wrapped, a pair of oppositely disposed packing pieces adapted to feed endwise into the open ends of the U-shaped wrapper on each side of the article in the wrapper, a rod positioned above the article between the ends of the U-shaped wrapper, a pair of folding elements adapted to fold over the upper ends of said U-shaped wrapper into engagement with each side of said rod, whereby when the said folding elements abut together they form a two-ply upstanding lip, said folding elements being heated to seal the plies of the lips together, operatively connected linkage adapted to successively withdraw the said packing pieces and said folding elements as the carrier turns to the next station, wiper means mounted above the carrier as it turns to said next station adapted to wipe said sealed lip flush against the top of the article, two pairs of end folding means at said next station, one pair of said end folding means being above and the other pair below the article and being sector shaped, movable supporting means for each pair of end folding means adapted to pivot the same towards each other and rotate the sectors thereof, to thereby fold the ends of the wrapper with an upstanding sealed two-ply lip by the abutting action of the sector-shaped folding means, means for returning said supporting means and said sector-shaped folding means to inoperative position, a final wrapper former at the last station of the carrier adapted to fold the end lip flush, and an ejector operatively associated with said former to eject the finished article.

2. The wrapping machine according to claim 1, wherein the said end folding means engage a heating element when in inoperative position.

3. The wrapping machine described in claim 1, wherein the supporting means for the sector-shaped folding means comprises a geared sector for each of said sector-shaped folding means, carrier arms therefor, teeth formed in the outer ends of each carrier arm and a gearwheel in mesh between said teeth on said carrier arms and the geared sectors, whereby movement of the said carrier arms imparts both pivotal and rotative movement to said sector-shaped folding means.

4. A machine for wrapping articles of cube or oblong form made of lightly compressed granules without deformation thereof, comprising an intermittently driven rotor, a plurality of carriers on the rotor, a plurality of successively positioned operating stations positioned at intervals around the rotor in the cycle of travel of each carrier, a wrapper feed arrangement and an article feed mechanism at the first of said stations, said carriers being shaped to form the wrappers into a U formation around the article to be wrapped, wrapper top folding means at the second of said stations adapted to fold the top over the article in the carrier without pressure in the article and form the edges of the wrapper with abutting upstanding lips, means intermediate the second and third stations of carrier travel adapted to wipe the upstanding abutting lips flush against the top of the article, the third station of carrier travel including end folding means adapted to fold the ends of the wrapper and form upstanding abutting lips at each end without pressure on the article, said end folding means comprising two pairs of folding members disposed one pair above and the other below the article, the said members being sector-shaped in cross section and adapted to turn axially to bring the flat side of each sector member flush against one end of the article and simultaneously form said upstanding lips.

WILLIAM EWAN MacKENZIE.

REFERENCES CITED

The following references are of record in the file of this patent:

UNITED STATES PATENTS

| Number | Name | Date |
| --- | --- | --- |
| 2,037,631 | Hultin | Apr. 14, 1936 |
| 2,334,029 | Ranney et al. | Nov. 9, 1943 |
| 2,397,190 | Malhiot | Mar. 26, 1946 |